United States Patent Office 3,654,070
Patented Apr. 4, 1972

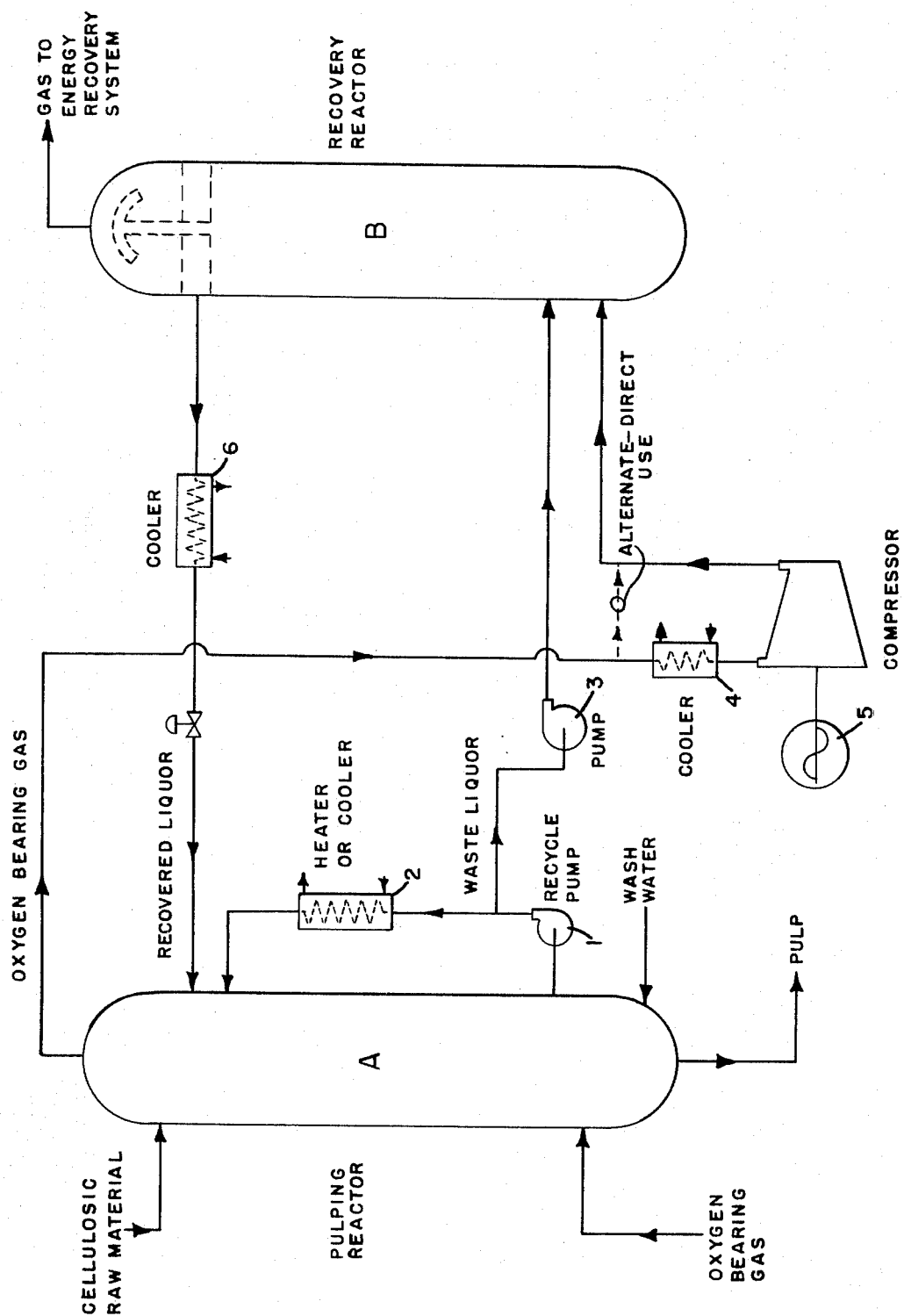

3,654,070
OXIDATION AND REUSE OF EFFLUENT FROM OXYGEN PULPING OF RAW CELLULOSE
Louis A. Pradt, Wausau, and Wayne B. Gitchel and Clarence A. Hoffman, Rothschild, Wis., assignors to Sterling Drug Inc., New York, N.Y.
Filed Apr. 2, 1970, Ser. No. 25,116
Int. Cl. D21c 11/14
U.S. Cl. 162—30
5 Claims

ABSTRACT OF THE DISCLOSURE

The spent liquor from the pulping of cellulosic material by oxidation in aqueous alkaline medium is subjected to oxidation with an oxygen-containing gas at a temperature between 200° and 375° C., which process oxidizes the organic waste products to carbon dioxide and regenerates the aqueous alkaline medium for reuse in the pulping process. The carbon dioxide produced is collected by liquefaction or directed to energy recovery systems.

This invention relates to a new process for producing cellulosic pulp by oxidizing cellulosic raw materials and oxidizing and recycling the effluent therefrom.

The predominant process currently used in the chemical pulping industry is the kraft process, which uses sodium hydroxide and sulfur compounds to remove lignin and other impurities from wood, leaving the cellulose pulp. The kraft process has the advantage that water pollution is minor compared to the older sulfite process, since the waste liquor from the kraft process is burned and most of the pulping chemicals are recovered. However, kraft pulp mills are major sources of air pollution because they emit volatile sulfur compounds which have an extremely unpleasant odor. Chemical pulping processes with sulfites of various alkali metals, alkaline earth metals, and ammonia under acid to mildly alkaline conditions are also extensively used. No entirely satisfactory chemicals recovery system has been developed for these processes however. The recovery systems are plagued by such disadvantages as air pollution, formation of interfering chemicals such as thiosulfates, and prohibitive costs. Without satisfactory recovery systems major stream pollution problems result.

Wood pulping by oxidation in alkaline medium is known (U.S. Pats. 2,673,148 and 2,926,114). However, the effluent from the oxidation pulping is either discarded, thereby contributing to stream pollution, or is processed by laborious procedures to remove the organic substances, mainly organic acids, therefrom. Alternatively, the organic matter can be destroyed by conventional evaporation and burning in a smelting furnace or other type of incinerator. However, this method produces air pollution, and a great quantity of water must be evaporated in order to make the liquor burnable. This makes the process economically unfavorable.

In the process of the present invention, the effluent from the oxidation pulping process is subjected to oxidation with an oxygen-containing gas at a substantially higher temperature than is used in the pulping process, whereby the organic materials are oxidized to the extent that the alkaline buffer solution (e.g. alkali metal bicarbonates) is substantially regenerated for recycling and reuse in the oxidation pulping step.

The process of the present invention possesses the following advantages over prior art processes.

(1) There is no appreciable air or water pollution produced by the process. The only gaseous effluents are carbon dioxide, when, for example, pure oxygen is supplied to the process, or carbon dioxide and nitrogen when, for example, air is supplied to the process. In either case the carbon dioxide can be liquefied and recovered. Alternately the gaseous effluent can be directed to energy recovery systems which generate steam or power or both, concurrent with carbon dioxide recovery. There is no liquid waste since the oxidation of the effluent from the pulping reaction regenerates the buffer solution which is then recycled to the pulping reactor.

(2) Excess oxygen not used in the oxidation of the raw cellulosic material and exiting from the pulping reactor can be collected and led into the reactor for oxidizing the liquid effluent. Thus the chemical reagents employed in the process, e.g., oxygen and sodium bicarbonate, are employed at maximum efficiency, since no oxygen is wasted and the sodium bicarbonate is largely regenerated for reuse.

The accompanying drawing is a schematic flow diagram showing an example of a pulping system for carrying out the process of the present invention.

Wood debarked and reduced to chips or other cellulosic raw material, e.g. agricultural residues, is fed into pulping reactor A containing an aqueous solution of buffer, e.g. sodium bicarbonate at pH between about 7 and 9, and is held at a temperature between about 120° and 180° C. An oxygen-bearing gas is introduced into the pulping reactor at a partial oxygen pressure of about 50 to 1,000 p.s.i. or greater. From time to time, as the oxidation of the cellulosic raw material proceeds, pulp is discharged from the reactor A. Additional fresh bicarbonate may be added directly to the reactor at any time to maintain the desired pH. Wash water may also be added directly to the reactor to cool the contents as needed and also to accomplish diffusion washing of reaction products from the cellulose. These and other devices apparent to those skilled in the art may be applied at discretion.

The buffer solution is withdrawn from one or more points on the reactor by a recycle pump 1, passed through a heater or cooler 2 and reintroduced into the reactor at one or more points. Several pumps and heaters or coolers may be used if desired. In this way, the temperature in the reactor can be controlled and various parts of the reactor can be maintained at different temperatures if desired.

Waste liquor may be conveniently withdrawn from one or more recycle streams and directed to the recovery reactor through pump 3. Alternately, waste liquor may be withdrawn directly from the reactor at any point as desired.

The oxygen-bearing gas not consumed in the pulping reactor A, exits from the reactor and is led to the recovery reactor B. If the pressure in reactor B is slightly less than that in reactor A, the exiting oxygen-bearing gas can be led directly from reactor A to reactor B; otherwise, the oxygen-bearing gas exiting from reactor A is passed through a cooler 4, if desired, and a compressor driven by motor 5, to bring the gas to the pressure required in reactor B. An independent source of oxygen e.g. pure oxygen or an oxygen bearing gas, for reactor B can be supplied if needed to supplement the oxygen exiting from reactor A. The liquid effluent and oxygen-containing gas in the recovery reactor B are heated at a temperature between about 200° and 375° C. and at a total pressure sufficient to keep most of the water in the liquid phase. A preferred temperature range is 300–320° C.

The oxygen in reactor B is practically all utilized, and the organic substances, largely salts of organic acids, present in the liquid effluent and produced by the oxidation of the cellulosic raw material, are substantially oxidized to carbon dioxide and water. Part of the carbon dioxide combines with the alkaline moiety of the effluent to regenerate bicarbonate, and the remainder exits from reactor B and is recovered as such or directed to energy recovery systems which generate steam or electric power. The oxidized effluent, comprising essentially an aqueous buffer solution, e.g. sodium bicarbonate, is taken from reactor B, passed through a cooler 6 and returned to the pulping reactor A to complete the cycle.

The concentration of solids, that is, buffering chemicals and organic compounds in the buffering solution, can be controlled by: (a) Varying the quantity of waste liquor removed which in turn varies the quantity of recovered liquor returned to the pulping reactor; (b) varying the quantity and quality of wash water introduced into the pulping reactor; and (c) varying the concentration of the solution of fresh buffering chemical added to replace chemical losses. Any of the foregoing techniques can be used alone or in any combination, and are within the skill of the art.

The pressure in the pulping reactor A can be regulated by controlling the rate of flow of the oxygen-bearing gas exiting from reactor A.

The gas exiting from the recovery reactor B can readily be cooled and the carbon dioxide therein liquefied, the liquefaction being facilitated by the fact that the carbon dioxide is already at a high pressure. Thus the process of the invention provides a source of carbon dioxide usable in commerce.

The invention can also be applied in the case in which the pulping reactor A is replaced by one or more batch reactors of the type commonly in present use in many pulp mills.

EXAMPLE

Gaseous oxygen (19.6 liters at standard temperature and pressure) was added to a mixture of 70 g. of aspen wood chips in 320 ml. of 53.6 g./l. sodium bicarbonate solution in a pulping reactor and the mixture heated at 140° C. and a total pressure of about 1200 p.s.i.g. The average oxygen partial pressure was about 1000 p.s.i.

The pulped material was filtered and washed with four 80 ml. portions of water. The filtrate and wash water were combined and oxidized with oxygen gas in a recovery reactor at 320° C. and a total pressure of from 2600 to 2850 p.s.i.g. The oxidized liquor was then adjusted by evaporation to a concentration of 25.6 g./l. total sodium, measured as sodium hydroxide. The pH of the liquor was then adjusted to 8.2 with carbon dioxide gas.

The above procedure was then repeated using the recovered liquor above with fresh wood and oxygen. The results of three such repetitions are as follows:

| | Pulp | | | Oxidized liquor | |
|---|---|---|---|---|---|
| Run number | Yield, percent of dry charge | Permanganate number | Lignin, percent of charge | Volatile acids as acetic acid, g./l. | COD, g./l. |
| 1 | 67.5 | 10.4 | 1.1 | 0.3 | 0.3 |
| 2 | 70.4 | 10.0 | 0.4 | 0.6 | 0.6 |
| 3 | 66.8 | 6.7 | 0.4 | 0.5 | 0.3 |

Good quality pulp was produced each time and the data shows that there was no deterioration in the yield and quality of product upon using a regenerated bicarbonate solution.

Analysis of the oxidized liquor showed that there was no build up of organic matter in the recovered liquor.

We claim:

1. In the process for producing cellulosic pulp from cellulosic raw material by treatment with oxygen or oxygen containing gas in a mild aqueous alkaline medium, the method which comprises treating the effluent from said treatment with an oxygen containing gas in a reactor at a temperature between 200° and 375° C. and a total pressure sufficient to maintain most of the water in the liquid phase whereby all organic material is substantially oxidized to produce an exhaust gas stream containing carbon dioxide and a buffer solution of pH 7–9, and using said buffer solution as the alkaline medium for producing pulp from further raw material.

2. The process according to claim 1 wherein the reactor temperature is between 300° and 320° C. and the pressure is sufficient to maintain most of the water in the liquid phase.

3. The process according to claim 1 wherein the excess oxygen not utilized in the raw material treatment is collected and supplied to the effluent oxidation reactor.

4. The process according to claim 1 wherein the exhaust gas streams are directed to energy recovery systems which generate steam or electric power.

5. The process according to claim 1 in which the carbon dioxide, exiting from the reactor in which the effluent is oxidized, is cooled and liquefied.

References Cited

UNITED STATES PATENTS

| 2,673,148 | 3/1954 | Harris | 162—65 |
| 2,926,114 | 2/1960 | Grangaard et al. | 162—65 X |
| 3,207,572 | 9/1965 | Saul | 162—31 X |
| 3,073,672 | 1/1963 | Cederquist | 162—31 X |

S. LEON BASHORE, Primary Examiner

A. L. CORBIN, Assistant Examiner

U.S. Cl. X.R.

23—49; 162—31, 35, 65